3,453,195
**GRAFT COPOLYMERS PREPARED BY IRRADIAT-
ING A HALOGEN CONTAINING BACKBONE CO-
POLYMER WITH U.V. LIGHT IN THE PRESENCE
OF A VINYL MONOMER**
Gerhard Kühne, Burghausen, Bavaria, Germany, assignor to Farbwerke Hoechst Aktiengesellschaft vormals Meister Lucius & Bruning, Frankfurt am Main, Germany, a corporation of Germany
No Drawing. Filed Feb. 3, 1965, Ser. No. 430,169
Claims priority, application Germany, Feb. 8, 1964,
F 41,958
The portion of the term of the patent subsequent to Oct. 25, 1983, has been disclaimed
Int. Cl. C08f 1/60, 1/18, 1/16
U.S. Cl. 204—159.15                                 8 Claims

ABSTRACT OF THE DISCLOSURE

A process for producing graft copolymers by contacting
(1) A polymer containing halogen atoms activated by the presence of electronegative groups with
(2) A monomer containing the $CH_2=C=$ structural unit in the presence of high-energy ultraviolet or gamma radiation. The reaction may be catalyzed by the presence of "per" compounds.

---

The present invention relates to a process for the manufacture of graft copolymers based on monomers containing the structural unit $CH_2=C<$ by the precipitation-, suspension- or emulsion method.

It is known that the mobility of a bound halogen atom is activated by a neighboring electronegative group, particularly a carboxyl group. For example, by boiling poly-alpha-chloro-acrylic acid in aqueous solution, the gel of a cross-linked polymer free from chlorine is obtained. This product has been identified as a cross-linked poly-lactone.

Now I have found that the presence of mobile halogen atoms in polymers or copolymers can be used for making graft polymers. According to the invention the process for the manufacture of graft copolymers based on monomers containing the structural unit $CH_2=C<$ by the precipitation-, suspension- or emulsion method, comprises graft-polymerizing a polymer or copolymer of a halogenated monomer, the halogen atoms of which are activated by one or more electronegative groups, with monomer compounds containing the structural unit $CH_2=C<$ under the action of rays rich in energy.

By rays rich in energy there are here meant ultraviolet rays or gamma rays, e.g. from cobalt 60 or caesium 137, X-rays or corpuscular rays, particularly fast electrons, or the radiation of a nuclear reactor.

The following scheme illustrates the course the reaction takes if the activated halogen atoms are bromine atoms:

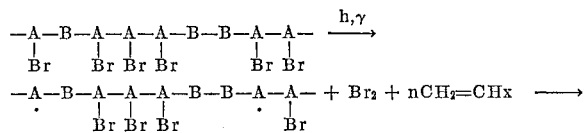

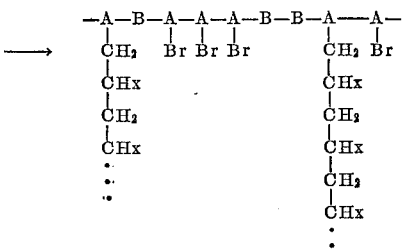

In these equations Br represents the chemical element bromine in monomer A containing the electronegative grouping, while B is a monomer which is free from halogen or contains a not activated halogen and which contains the grouping $CH_2=C<$, and $x$ is an electrophile component and $n$ is a whole number.

The polymers or copolymers containing activated halogen can be obtained by polymerizing halogenated monomers, for example alpha-bromoacrylic acid esters of primary straight-chain or branched alcohols with 1 to 8 carbon atoms, β- or γ-bromobutyric acid vinyl- or allyl ester, ε-bromocaproic acid vinyl- or allyl ester, p-bromobenzoic acid vinyl- or allyl ester, p-bromostyrene, acrylic- or methacrylic acid-β-bromoethyl ester, α,β-dibromobutyric acid vinyl- or allyl ester, bromoacetic acid vinyl- or allyl ester, or bromomaleic acid- or bromofumaric acid diethyl ester, or the mixtures thereof.

Alternatively the polymers containing activated halogen atoms can be obtained by transfer reaction of growing chains with halogenated hydrocarbons, for example bromoform, carbon tetrabromide or ethylene bromide. Acrylic acid butyl ester, for example, undergoes a radical-initiated polymerization in the presence of carbon tetrabromide. In this case, bromine-containing polymers are formed by transfer reactions according to the following Equation 2:

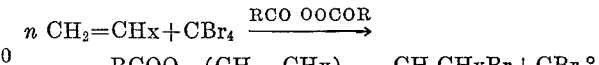

$$RCOO-(CH_2-CHx)_{n-1}-CH_2CHxBr+CBr_3°$$

in which $x$ represents an electrophile radical and $n$ is a whole number.

Bromine-containing polymers are advantageously used. Polymers containing chlorine or iodine may also be used. It must be taken into account, however, that chlorine-containing polymers are less active in the subsequent grafting reaction and that iodine-containing polymers are less recommendable from a technical viewpoint.

The monomers containing active halogen can be polymerized according to the above scheme either alone or in admixture with one another or with any other monomer having one or more double bonds and being capable of a free radical polymerization. The number of different monomers may amount to up to 5.

As monomers containing no active halogen, the following substances may, for example, be used for grafting: all acrylic or methacrylic acid esters with straight-chain or branched alkyl radicals with up to 8 carbon atoms, all vinyl esters with a straight-chain or branched acid radical with up to 18 carbon atoms, all vinyl aromatic substances such as styrene, vinylnaphthalene and their homologs, acrylonitrile, vinyl chloride and vinylidene chloride, maleic acid esters with up to 8 carbon atoms in the straight or branched alkyl chain, and butadiene and its homologs. The quantitative proportion of the components of the copolymer that contain activated halogen atoms to the components containing no activated halogen atoms is generally within the range of 95:5 to 5:95.

If a copolymer is used as the trunc polymer, the copolymer is advantageously built up in some cases, depending on the grafting conditions chosen, in a manner such that one component of the copolymer is identical with the monomer to be grafted or corresponds to its structure. If, for example the monomer to be grafted is styrene and the trunc polymer is a copolymer, the latter advantageously contains styrene or a homolog thereof.

The polymer containing activated halogen may be prepared in mass, that is in the absence of solvents or diluents, in solution, emulsion or suspension. It is generally advantageous to prepare the polymer in emulsion since the larger total surface area of the particles so obtained enchances the chances of a graft reaction taking place.

The monomers to be grafted are likewise radical type-monomers. They are in the first place monomers that are easy to activate and are capable of a free radical polymerization. There may therefore be used the monomers containing no activated halogen atoms which have been mentioned above for the manufacture of copolymers. Exemplary of such monomers are styrene derivatives, all vinyl aromatic substances, for example vinyl naphthalene or vinyl toluene, vinylidene chloride, vinyl esters and vinyl ethers with 1 to 18 carbon atoms in the straight or branched alkyl chain of the corresponding acid or alcohol. Particularly suitable are vinyl chloride, styrene, acrylic or methacrylic acid esters with 1 to 8 carbon atoms in the alkyl group and acrylonitrile. Mixtures of the said monomers may also be used.

Grafting may be carried out in a manner such that the trunc polymer is placed in the reaction vessel in an emulsion, suspension, melt or solution and the monomer to be grafted is then introduced, while stirring, and the whole is subjected to the grafting conditions chosen. To these conditions belong, as is known, an elevated temperature and the action of rays rich in energy, advantageously ultraviolet light or hard corpuscular rays. It is also very advantageous to add an activator or radical forming substance, preferably a catalytic amount of a per compound. When the process is carried out in an aqueous medium, the per compound is advantageously a water-soluble per salt.

Alternatively, the monomer to be grafted may be prepolymerized in mass, emulsion, suspension or solution and the trunc polymer may be added to the mass, emulsion, suspension or solution which is being polymerized at a determined extent of conversion at which monomer proportions are still present. In this case a well defined polymer mixture is obtained which consists of the polymer proportion of the monomer to be grafted, the graft proportion of this monomer with the trunc polymer and unchanged trunc polymer. In this mode of working, the extent of conversion of the preformed polymer may be within the range of 10 and 90%. When the process is carried out in an aqueous emulsion, the polymerization of the monomer to be grafted is carried out to such an extent that at least 60%, advantageously 70 to 85%, of the monomer is polymerized. In the following graft reaction under the action of rays rich in energy, the total mixture is polymerized until an extent of conversion of advantageously at least 90% has been reached.

The process for making graft copolymers in accordance with the invention enables in the first place determined physical properties of the homo- or copolymers to be improved. For example, the thermostability under load of polyvinyl chloride can be considerably improved by grafting methacrylic acid methyl ester or acrylic acid cyclohexyl ester on to a given vinyl chloride-copolymer containing activated halogen atoms. Also, the processability of polyvinyl chloride can be improved by grafting vinyl chloride copolymers on to a polyvinyl chloride latex which is being polymerized.

The impact strength of polystyrene can be improved by grafting styrene on to a styrene vinylnaphthalene trunc polymer containing para-bromostyrene.

The proportion of the component to be grafted is generally within the range of 1 to 40 parts, advantageously 5 to 10 parts, calculated on the weight of the total polymer.

The graft copolymers of the invention constitute new compounds.

The following examples serve to illustrate the invention but they are not intended to limit it thereto, the parts being by weight.

Example 1

5 liters of a latex (7.5% strength, pH 9.5) of a copolymer of 45 parts of acrylic acid butyl ester, 5 parts of alpha-bromoacrylic acid-n-butyl ester and 50 parts of vinylidene chloride were placed in a 10-liter autoclave provided with a stirrer and an ultraviolet lamp of 500 watts. 6 grams of potassium persulfate and 30 grams of an alkylaryl sulfonate were added as an additional emulsifier. The autoclave was then scavenged with nitrogen and evacuated and 3 kilograms of vinyl chloride were introduced under pressure. The autoclave was then heated to 50° C., the ultraviolet lamp was switched on and the batch was polymerized at that temperature until the pressure had dropped to 3.5 atmospheres gage. A polyvinyl chloride graft latex of 40% strength was obtained which had a plastomer content of 12.2%. After drying on a drum dryer or spray drying device, the product was worked up on a calender in one instance and on an extruder in another instance.

In the work-up on a calender, the draw-off speed was increased by 10% as compared with pure polyvinyl chloride, without the physical properties of the sheets or films being impaired. Particularly the thermostability under load of the sheets or films remained completely unchanged as compared with sheets of pure polyvinyl chloride.

Example 2

In a 300-liter autoclave provided with a stirrer and an ultraviolet lamp of 900 watts, 95 kilograms of vinyl chloride and 5 kilograms of para-bromobenzoic acid allyl ester were emulsified in 100 liters of an aqueous solution of 2.5 kilograms of alkyl sulfonate having 14 carbon atoms, 0.2 kilogram of potassium persulfate and 1 kilogram of disodium phosphate, and the whole was heated to 60° C. After the pressure had dropped to 4 atmospheres gage, that is after an extent of conversion of 90% had been reached, 10 kilograms of methacrylic acid methyl ester were introduced under pressure, the ultraviolet lamp was switched on and the polymerization was continued for 5 hours to bring about grafting. A graft latex of 48% strength was obtained which was worked up by drum drying in one instance and spraying in another instance.

The product so obtained was made into a sheet by rolling at 170° C. on a double drum dryer in the presence of a heat stabilizer. The second order transition temperature determined according to the oscillating twisting method (cf. K. Schmieder and K. Wolf, Koll, Z., 127, pages 65 to 78, 1952) was by 8° C. higher than that of a pure polyvinylchloride sheet.

Example 3

In a 300-liter autoclave provided with a stirrer, 75 kilograms of styrene, 20 kilograms of vinyl naphthalene and 5 kilograms of para-bromostyrene were polymerized at 80° C. in 160 kilograms of water containing 3 kilograms of lauryl sulfate, 0.2 kilogram of potassium persulfate and 0.1 kilogram of disodium phosphate as emulsifier, until an extent of conversion of 96% had been reached. A 32% latex was obtained which was further treated as follows:

90 kilograms of styrene and 25 kilograms of the above latex were placed in a vessel provided with a stirrer and a cobalt-60-lamp, and thoroughly mixed for 30 minutes. 200 kilograms of water containing 0.5 kilogram of partially esterified polyvinyl alcohol were then introduced and the monomer-polymer mixture was suspended in very fine drops. After adding 2 kilograms of styrene in which 0.2 kilogram of di-tert. butyl peroxide had been dissolved, the co-60-lamp was switched on and the contents of the vessel were heated to 80° C. After 4 hours the temperature was increased to 120° C. and after a further 6 hours to 130° C. to polymerize the residual monomer portion. After a total time of reaction of 16 hours, the reaction was terminated. The granular polymer so obtained was filtered on a push-type centrifuge, washed and subsequently dried at 60° C. in a chamber with recycle of air.

A test bar dimensioned according to DIN and made from the above product on an extruder had an impact strength according to Charpy of 60 cm.kg./cm.$^2$ and a notched impact strength according to Izod of 12.3 cm.kg./cm.$^2$. In a comparison test with pure polystyrene, the following results were obtained: impact strength 15 cm.kg./cm.$^2$ and notched impact strength of 3.5 cm.kg./cm.$^2$.

Example 4

690 kilograms of reaction medium containing 9.0 kilograms of an alkylaryl sulfonate having 12 carbon atoms, 0.4 kilogram of disodium phosphate and 0.27 kilogram of potassium persulfate were placed in a 1.5 m.$^3$ autoclave provided with a stirrer and two ultraviolet lamps of 900 watts each. After evacuating and scavenging with nitrogen, 572 kilograms of vinyl chloride were introduced and the whole was heated to a temperature of 65° C. while stirring moderately. After a reaction time of 8 hours, the pressure had dropped to 9.5 atmospheres gage, which corresponded to an extent of conversion of about 70%. When this extent of conversion had been reached, 108 kilograms of a 37% latex consisting of 50 parts of vinyl chloride, 45 parts of acrylic acid butyl ester and 5.0 parts of α-β-dibromo-butyric acid allyl ester were introduced under pressure, the ultraviolet lamp was switched on and the polymerization of the residual vinyl chloride was continued until an extent of conversion of 92% had been reached, that is until the pressure had dropped to 3.5 atmospheres gage.

The 40.5% graft latex so obtained was worked up by drum drying. The product contained 7% of the modification component which imparted to the product an improved processability as compared with pure polyvinyl chloride. When the product was worked up into first-quality sheets or films free from plasticizer, it was sufficient to pregelatinize it on one roll mill whereas a normal raw material required two roll mills. The sheet or film properties, such as surface quality, appearance of fish eyes, suitability for deep drawing and high-frequency welding, of the product of the invention were not impaired, particularly the thermostability under load remained completely unchanged as compared with a sheet of pure polyvinyl chloride, as is evident from the following table.

violet light or high energy ionizing irradiation, polymerizing at least 90% of the vinyl chloride.

2. The process of claim 1 wherein the reaction is carried out in the presence of a catalytic amount of a per compound.

3. The process of claim 1 wherein a catalytic amount of a water-soluble per salt is concomitantly used when effecting the reaction in an aqueous medium.

4. The process of claim 1 wherein the halogen atoms of the polymer to be reacted are bromine atoms.

5. The process of claim 1 wherein the starting polymer is a copolymer based on
 (a) molecules of at least one monomer compound containing halogen atoms which are activated by carboxyalkyl groups and
 (b) molecules of at least one monomer compound lacking an activated halogen atom, the monomers on which the copolymer is based containing the chemical unit $CH_2{=}C{<}$, the proportion of the (a) monomers to (b) monomers in the copolymer being about 95–5:5–95.

6. A process for preparing a graft latex polymer comprising polymerizing vinyl chloride to obtain a conversion of about 10 to 90% and thereafter adding a latex consisting essentially of a polymer of about 50 parts vinyl chloride, 45 parts of acrylic acid butyl ester and 5 parts of α-β-dibromobutyric acid allyl ester; effecting the graft under pressure in the presence of ultraviolet radiation and working up the resulting graft polymer.

7. A process for the manufacture of graft copolymers based on monomers containing the structural unit $$CH_2{=}C{<}$$

which comprises polymerizing a monomer compound containing the structural unit $CH_2{=}C{<}$ and being free from activated halogen atoms in an aqueous suspension to such an extent that at least 60% of the said monomer is converted into the polymer form, introducing into the mixture so obtained a polymer containing, as substituents, halogen atoms which are activated by electronegative groups, and polymerizing the total mixture to an extent of conversion of at least 90% in the presence of ultraviolet light or high energy ionizing irradiation.

8. Graft copolymers obtained by the process of claim 1, which contain 1 to 40 parts of the graft component, calculated on the weight of the graft copolymer.

References Cited

UNITED STATES PATENTS

| | | | |
|---|---|---|---|
| 2,666,025 | 1/1954 | Nazaki | 204—158 |
| 2,873,240 | 2/1959 | Miller | 204—158 |
| 2,940,952 | 6/1960 | Miller | 204—159.16 |
| 3,019,208 | 1/1962 | Reid et al. | 260—884 |
| 3,257,340 | 6/1966 | Osmond | 260—876 |
| 3,281,345 | 10/1966 | Kühne | 204—159.16 |

OTHER REFERENCES

Immergut et al., Graft and Block Copolymers, Die

TABLE

| Product | Surface quality | Tensile strength, kp./cm.$^2$ | Breaking elongation, Percent | Impact tensile strength,[1] cm. kp./cm.$^2$ | Deep drawing range [2] in sec., ratio 1:1.75 | Thermostability under load, °C. |
|---|---|---|---|---|---|---|
| Graft polymer | Smooth | 504 | 137 | 342 | 1.3 | 75–80 |
| Normal polyvinyl chloride | do | 512 | 104 | 285 | 3.0 | 75–80 |

[1] Tested according to the Racké method (cf. "Materialprüfung" 3/3, 1961, page 89).
[2] Tested on a Negri-Bossi apparatus which indicates the so-called deep-drawing tolerance. A product having a relatively wide range of tolerance is desired.

I claim:

1. A process for the manufacture of graft copolymers based on α,β - unsaturated monomers containing halogen atoms activated by carboxyalkyl groups attached to an adjacent carbon atom, comprising contacting the basis polymer or copolymer containing halogen atoms activated by carboxyalkyl groups attached to an adjacent carbon atom with vinyl chloride in the presence of ultra- Makromolekulare Chemie 18/19 322–341 (1956) pp. 1, 2 and 8.

GEORGE F. LESMES, *Primary Examiner.*

J. T. GOOLKASIAN, *Assistant Examiner.*

U.S. Cl. X.R.

204—159.16, 159.17; 260—875, 884